United States Patent [19]

Knight et al.

[11] 4,236,545

[45] Dec. 2, 1980

[54] USE OF RADIATION-INDUCED POLYMERS AS FRICTION REDUCING AGENTS

[75] Inventors: Bruce L. Knight, Findlay, Ohio; John S. Rhudy; William B. Gogarty, both of Littleton, Colo.

[73] Assignee: Hercules Incorporated, Wilmington, Del.

[21] Appl. No.: 866,073

[22] Filed: Dec. 30, 1977

Related U.S. Application Data

[63] Continuation of Ser. No. 739,686, Nov. 8, 1976, abandoned, and a continuation-in-part of Ser. No. 303,742, Nov. 6, 1972, abandoned.

[51] Int. Cl.$^2$ ................................................ F17D 1/17
[52] U.S. Cl. .................................. 137/13; 252/8.5 R; 252/8.55 R
[58] Field of Search ...................... 137/13; 252/8.55 R, 252/8.5 R; 204/159.22; 260/551 R

[56] References Cited

U.S. PATENT DOCUMENTS

| | | | |
|---|---|---|---|
| 3,472,769 | 10/1969 | Lummus | 137/13 X |
| 3,681,215 | 8/1972 | Peterson | 137/13 X |

*Primary Examiner*—Alan Cohan
*Attorney, Agent, or Firm*—Jack L. Hummel

[57] ABSTRACT

Drag reduction of fluids containing a water phase, e.g. hydrocarbon-in-water mixture, flowing through a conduit, is reduced by incorporating within the water phase a polymer obtained by radiation-induced polymerization of acrylamide, methacrylamide, acrylic acid, methacrylic acid, alkali metal salts thereof, or mixtures thereof. The polymerization is preferably carried out in 10–60% aqueous monomer solution with gamma radiation. The mixture of monomers, before radiation, preferably contains 25–99% acrylamide and 75–1% sodium acrylate. The polymer preferably shows viscoelastic effects at high concentrations in a solvent. Concentrations of about 1–10,000 ppm of the polymer in the water phase is desired. Examples of fluids useful with this invention include hydrocarbon-in-water and water-in-hydrocarbon slurries, the hydrocarbon is preferably comminuted oil shale or coal, congealed particles of crude oil and/or wax, viscous crude oil, etc.

29 Claims, No Drawings

USE OF RADIATION-INDUCED POLYMERS AS FRICTION REDUCING AGENTS

CROSS REFERENCE TO RELATED APPLICATION

This Application is a continuation of application Ser. No. 739,686 filed Nov. 8, 1976 now abandoned which was a Continuation-in-Part of co-pending U.S. Ser. No. 303,742, filed Nov. 6, 1972 now abandoned.

BACKGROUND OF THE INVENTION

1. Field of the Invention

This invention relates to transporting fluids in a conduit containing water and hydrocarbon wherein the fluid flow friction loss is reduced by incorporating within the water phase of the fluid a viscoelastic polymer obtained by radiation-induced polymerization.

2. Description of the Prior Art

It is generally known that high molecular weight polymers are useful as drag-reduction agents in the transportation of fluids during turbulent flow. Drag reduction as used herein includes reducing the fluid flow friction loss in the transmission of fluids through conduits. Of course, reducing the drag also reduces pumping requirements and hence the cost of transporting fluids through conduits or pipelines. This phenomenon has been reported in "Turbulence Studies of Steady and Pulsed Flow of Drag Reducing Solutions", Thomas, Greene, Nokes, and Chu, The University of Akron, and "Drag Reduction in Non-Aqueous Liquids", Ramakrishnan and Rodriquez, Cornell University, both of these papers given at the 72nd National Meeting of the American Institute of Chemical Engineers at St. Louis, Missouri, May 21-24, 1972. These papers generally conclude that the drag reduction decreases as the concentration of the polymer increases up to an "optimum concentration". Also, the papers conclude that the optimum concentration decreases as the molecular weight of the polymer increases.

Patents representative of this art include U.S. Pat. No. 3,493,000 to Canevari et al which teaches that reduction in friction losses are obtained with addition of polydimethylsiloxane, cis-polyisoprene, cis-polybutadiene, and ethylene dipropylene copolymer; these polymers having average molecular weights in the range of 3-30,000,000 and preferably 7-20,000,000.

U.S. Pat. No. 3,472,769 to Lummus teaches synergistic action between a thickening agent and a friction-reducing agent to improve hydraulic friction characteristics of drilling fluids. The thickening agent can be methylcellulose, guar gum, completely hydrolyzed polyacrylamide, copolymer of methyl vinyl ether and maleic anhydride and a copolymer of vinyl acetate and maleic anhydride. The friction-reducing agent can be a copolymer of acrylic acid and acrylamide, a dextran-type polysaccharide, etc.

U.S. Pat. No. 3,542,044 to Hansen et al reduces energy loss during flow of oil through a pipeline by admixing with the oil an aqueous polyacrylamide solution preferably containing a dispersing agent. The polyacrylamide should have a molecular weight of at least 3,000,000 and should have about 5-40% of the original amide groups hydrolyzed to carboxylic groups. Such polymers are known as partially hydrolyzed, high molecular weight polymers. The patent mentions that polyisobutylene is useful as an oil-based friction reducer but that such is not readily dispersible and is sensitive to shear and high temperature; and, as a result, upon dissolution by heating and stirring, the effectiveness of the polyisobutylene is reduced.

U.S. Pat. No. 3,681,215 to Peterson teaches preparing water-soluble polymers containing at least 50% of acrylamide by dissolving vinyl and acrylamide monomers and an organic acrylic azo compound (as catalyst) in liquid ammonia (the ammonia can contain up to 25% water but is preferably anhydrous) and thereafter irradiating the mixture at a temperature less than 50° C. The liquid ammonia functions as a reaction solvent for acrylamide and the other vinyl monomers. The irradiation is only used to activate the organic acrylic azo compound which in turn catalyzes the polymerization process.

Examples of patents which teach high molecular weight polyacrylamides include U.S. Pat. No. 2,842,492 to Engelhardt et al; U.S. Pat. No. 3,002,960 to Kolodny; U.S. Pat. No. 3,020,953 to Zerweck et al; U.S. Pat. No. 3,025,237 and 3,070,158 to Roper; Canadian Pat. No. 683,476 to Siegel et al; U.S. Pat. No. 2,827,964 to Sandiford et al; and U.S. Pat. No. 3,037,529 to McKennon.

The most effective drag-reducing polymers are those with a linear, flexible structure which achieve a spherically symmetric distribution of mass elements along the center of mass (random coil) when placed in solution. Also, drag reduction with very dilute polymer solutions is observed to increase with molecular weight of the polymer, concentration of the polymer, and solvent wall shear stresses.

SUMMARY OF THE INVENTION

Applicants have discovered that the loss of fluid flow friction can be reduced by admixing 1-10,000 ppm of a polymer into the water phase of the fluid. The polymer is obtained by radiation polymerization of acrylamide, methacrylamide, acrylic acid, methacrylic acid, alkali metal salts thereof or mixtures thereof—a catalyst such as that defined in U.S. Pat. No. 3,681,215 is not needed and is not desired. Preferably the polymer is a copolymer. Radiation polymerization is carried out in an aqueous solution containing 10-60% by weight of monomer. The preferred monomer is a mixture containing 25-99% acrylamide and 75-1% of sodium acrylate, the percents based on weight. Radiation intensity is preferably 250-1,000,000 rads/hr and the radiation dose is preferably 500-300,000 rads. The reaction product can be diluted with water and used directly, or the polymer can be extracted from the reaction product, dried, and thereafter solubilized.

PREFERRED EMBODIMENTS OF THE INVENTION

The monomer is preferably a combination of at least one compound selected from the group consisting of acrylamide and methacrylamide and at least one compound selected from the group consisting of acrylic acid, methacrylic acid, alkali metal acrylate, and alkali metal methacrylate. However, homopolymers of one of the above monomers are also useful. Minor amounts of additional ethylenically unsaturated monomers which are copolymerizable are useful. Preferably, the monomer is a mixture of acrylamide and sodium acrylate. It is preferred that the monomer contain about 1-75% and more preferably 15-55% and most preferably 25-50% of acrylic acid or an alkali metal salt thereof, e.g. sodium acrylate.

Irradiation of the monomer is preferably carried out in an aqueous solution containing about 10% to about 60% and more preferably about 15% to about 45% by weight of dissolved monomer; thus, the water concentration can be about 40% to about 90%. At the lower concentrations of monomer, the product is generally a pourable polymer solution and at concentrations of above about 15% by weight, the product is generally a nonpourable gel. A water-insoluble product may result at monomer concentrations greater than 60%; thus, such high concentrations are undesirable. The particular limits of monomer concentration depend on the radiation conditions, the monomers, the desired product for a particular use, etc. Also, the intrinsic viscosity of the polymer product increases as the monomer concentration increases, up to the point where the amount of cross-linking becomes appreciable, provided all other variables are held constant.

The aqueous monomer solution preferably contains not more than about 5 ppm of transition metal ions, such as nickel, iron, and cobalt, and no more than about 0.5 ppm of cuprous and cupric ions.

Irradiation of the aqueous monomer solution may be accomplished with high energy ionizing radiation. The radiation used has a wavelength below 3,500 Angstroms and preferably below 2,000 Angstroms. The radiation employed may be particulate or electromagnetic in nature. Examples include accelerated electrons, protons, and neutrons, as well as X-rays and gamma-rays, the latter being preferred.

Radiation intensity is preferably about 1,000 to about 300,000 rads/hr and more preferably about 5,000 to about 200,000 rads/hr. Intensity directly influences the molecular weight of the copolymer. That is, under otherwise identical conditions, low intensities generally give higher molecular weights.

The radiation dose is preferably at least about 1,000 rads and more preferably at least about 1,500 rads. The maximum dose level is preferably not more than 100,000 rads and more preferably not more than 50,000 rads.

The radiation dose used directly influences the intrinsic viscosity and degree of monomer-to-polymer conversion. At a given radiation intensity and monomer concentration, an increase in radiation dose generally tends to result in a decrease in the intrinsic viscosity of the polymer produced and an increase in the degree of monomer-to-polymer conversion. The radiation dose influences the water-solubility of the polymer, i.e. at a high radiation dose, the resulting polymer tends to be water-insoluble. At the preferred dosage rates, conversion up to about 100% and preferably 80–100% of the monomer to polymer may be obtained without undue insolubilization.

The pH of the aqueous monomer solution is generally not critical except very low pH value may cause insoluble products to form. Preferably the pH is within the range of 3–13 and more preferably about 8 to about 11. Although higher and lower pH values may be used, it should be recognized that hydrolysis tends to occur at pH values much below about 3 and much above about 11.

While the process described above may be used to prepare polymers having an intrinsic viscosity from about 6 to about 30 dl/g (deciliters per gram) in 2 normal sodium chloride at 25.5° C., the process is modified somewhat to prepare polymers having an intrinsic viscosity below about 6 dl/g or above about 30 dl/g in 2 normal sodium chloride at 25.5° C. Polymers having an intrinsic viscosity below about 6 dl/g are prepared by carrying out the polymerization reaction described above in the presence of a chain transfer agent. The chain transfer agent tends to restrict the growth of active polymer chains and thereby results in the formation of polymers having lower molecular weights and lower intrinsic viscosities. The chain transfer agents which may be used herein may be any chain transfer agent which tends to restrict the growth of the polymer chains and thereby aid the formation of lower molecular weight and lower intrinsic viscosity polymers and which is soluble in the reaction medium. Examples of such transfer agents include lower alkyl alcohols, such as methanol, ethanol, and isopropanol; halogenated compounds, such as trichloroacetic acid; thiosorbitols containing two thio groups and four secondary hydroxyl groups; and mercaptans. The amount of chain transfer agent used depends upon the intrinsic viscosity desired, the monomer concentration, and the chain transfer constant of the chain transfer agent used. The use of a chain transfer agent is not necessary in order to prepare polymers having intrinsic viscosities from about 6 to about 30 dl/g; but if desired, such polymers may be prepared in the presence of chain transfer agents.

In order to prepare polymers having an intrinsic viscosity above about 30 dl/g, the polymerization reaction is terminated when less than about 75% and preferably when less than about 60% by weight of the monomer has been converted to polymer. It has been found that the intrinsic viscosity of the resulting polymer tends to decrease as the percent conversion of monomer to polymer increases. For reasons of economy, it is not practical to tolerate conversions lower than about 20%.

The variables of radiation intensity, total radiation dose, and monomer concentration discussed above are interdependent variables. While useful polymers may be prepared at all monomer concentrations, radiation intensities, and radiation dosages within the ranges given heretofore, all combinations of concentration, dose, and intensity within these ranges may not be used to prepare polymers useful in the process of this invention. For example, while a polymer useful in the process of this invention may be prepared at a monomer concentration of 60% by weight, provided the radiation dose used is sufficiently low to result in the formation of water-soluble polymers, the use of a monomer concentration of 60% by weight, an intensity of 250 rads per hour, and a dose of 300,000 rads results in the formation of water-insoluble polymers. In view of this interdependency of intensity, dose, and monomer concentration, it may be necessary to perform a limited amount of experimentation in order to prepare a polymer having the desired intrinsic viscosity. However, this experimentation may be kept to a minimum in view of the disclosure in Table 1 below for the preparation of a variety of polymers of different viscosities and in view of the discussion above on the effect of intensity, dose, monomer concentration, degree of conversion, and chain transfer agent on the intrinsic viscosity of the polymer. Accordingly, the reaction conditions which may be used to prepare a water-soluble polymer having an intrinsic viscosity different from the intrinsic viscosities of the polymers described in Table 1 may be readily determined by minor modification of the reaction conditions given in Table 1 for the preparation of the polymer having the intrinsic viscosity nearest to the intrinsic viscosity of the polymer which is desired to be prepared. Such modification may be made in view of the discussions above on the effect of intensity, dose, monomer concentration, percent conversion of monomer to polymer, and chain transfer agent on the intrinsic viscosity of the polymer. For example, a polymer having an intrinsic viscosity of about 16 dl/g may be prepared by using the same reaction conditions employed in Example F, Table 1, except that the radiation intensity is increased, the total radiation dose is increased, the monomer concentration is lowered, the percent monomer conversion is increased, and/or the reaction is carried out in the presence of a chain transfer agent. It is generally preferred, however, that the said decrease in intrinsic viscosity be obtained by increasing the radiation intensity, lowering the monomer concentration, and/or using a chain transfer agent.

The product of irradiation is an aqueous solution of the water-soluble polymer which may be in the form of a pourable liquid or a non-pourable, rubbery gel, depending upon the polymer concentration and intrinsic viscosity. The viscosity of the polymer solution tends to increase as the polymer concentration and intrinsic viscosity of the polymer increases. Polymer solutions produced by the radiation may be admixed with water and used directly or the polymer solution may be concentrated by conventional means or it may be recovered in particulate form, i.e. dry form. For example, a non-pourable gel may be finely subdivided and the water removed from the subdivided gel with a water-miscible, volatile organic liquid, e.g. with methanol, which has no affinity for the copolymer.

The polymer may contain cations, preferably monovalent cations and more preferably sodium.

Polymers obtained from this radiation polymerization have relatively low Huggins constants. This constant is related to the linearity of the polymer where molecular weights are constant, i.e. for two copolymers having similar molecular weights, but different Huggins constant, the lower Huggins constant indicates a more linear polymer. Polymers having Huggins constants below 1 and preferably below 0.7 and more preferably below 0.5 are most often used with this invention. In certain applications, a mixture of polymers having low and high, or low, medium, and high Huggins constants may be desired. A more detailed definition of Huggins constant and a method for determining Huggins constant of a polymer is found in "Textbook of Polymer Chemistry," Billmeyer, Interscience Publishers, N.Y., 1957, pp 128–139.

The intrinsic viscosity of the polymer can vary from 1 to about 60 dl/g and above. To prepare polymers having intrinsic viscosities from 30 to about 60 dl/g, it is preferred that the radiation intensity be below about 50,000 rads/hr and the monomer concentration of the aqueous solution to be radiated be about 20% to about 60% and that the conversion of the monomer to the polymer be about 30% to about 75%, and more preferably about 50% or less. Where it is desired that the polymers have the highest molecular weight, the reaction conditions should be such that the dosage and conversion be low, the monomer concentration be relatively high, and the radiation intensity be relatively low—these preferred parameters being within the reaction conditions discussed previously. Where it is desired to branch or partially cross-link the polymer and obtain a less water-soluble polymer, the polymer can be branched or partially cross-linked by over-radiating. That is, by continuing the radiation after all the monomer has been converted to polymer, or continuing the radiation after insoluble polymer begins to appear. Also, partially cross-linking can be effected using ethylenically unsaturated water-soluble copolymerizable monomers containing more than one ethylenically unsaturated bond. Examples of such monomers include methylene bisacrylamide, polyacrylates such as sorbitol polyacrylates, and polyallyl ethers of sorbitol such as hexallyl sorbitol. Where these monomers are used in the radiation polymerization process, they are preferably present in concentrations of about 0.01 to about 10% and more preferably 0.05 to about 5% and most preferably 0.1 to about 3%, by weight.

The fluids for which the fluid flow friction loss can be reduced are defined as those fluids containing a water-phase; water-in-hydrocarbon slurries, emulsions and microemulsions; hydrocarbon-in-water slurries, emulsions, and microemulsions; any mixture of water and any other material, whether solid or liquid or gas; and like mixtures. The hydrocarbon can be liquid (e.g. crude oil, including viscous crude having pour points above about 50° F.; partially refined products of crude oil; refined products of crude oil; and any material containing carbon which is liquid at pipeline conditions); gas; or solid (e.g. tar sands; oil shale; coal; congealed or solidified hydrocarbon, preferably wax; etc.—preferably the solids are comminuted); or mixtures thereof. Preferably the fluid is a Newtonian fluid; but, this limitation is not critical. Also, the fluid is preferably a liquid under pipeline pressure and more preferably a liquid under turbulent flow. Thus, Reynolds Numbers down to 2,000 or less and up to 4,000 are useful in particular applications such as slurries; preferably the Reynolds Number is above 4,000. Examples of preferred fluids include water-external slurries containing crude oil or comminuted oil shale or comminuted coal or a mixture of congealed wax and a partially refined fraction of crude oil or partially refined fraction of crude oil or mixtures of any two or more of the above.

The polymer is preferably present in the water phase of the fluid in concentrations of about 1 to about 10,000 ppm and more preferably about 10 to about 1,000 ppm and most preferably about 50 to about 500 ppm of polymer, based on the water phase. The water phase may be the external or internal phase of the fluid. Concentration of the water phase in the fluid to be transported is preferably at least 20% and more preferably at least 30% by volume. The upper limit of the water concentration will generally depend upon the economics of transporting water. However, where the aqueous polymer solution is used as a veneer around viscous fluids, then the concentration of the water phase can be below about 0.5% to about 5% or more by volume, based on the composite fluid transported.

The polymer exhibits viscoelastic properties at high concentrations in the fluid in which it is dissolved. For example, a 1–3% by weight concentration of the water-soluble polymer in water exhibits both elastic and viscous properties. Such polymers exhibit good drag reduction characteristics at low concentrations.

Generally speaking, the higher the molecular weight, the more viscoelastic are the polymers of this invention. Also, the more linear is the polymer, the more effective is that polymer to impart good drag reducing characteristics to the flow of fluids in a conduit.

The polymer may be mixed directly with the fluid to be transported. The rate of solution can be increased by adding a concentrated polymer solution to the water phase. Also, the aqueous polymer solution can be injected around the circumference of a conduit to facilitate transportation of viscous fluids—the polymer solution is desirably positioned as a veneer around the viscous fluids. Other methods known in the art are useful with this invention to facilitate mixing of the polymer with the external phase of the fluid.

Other additives may be incorporated within the fluid to be transported. For example, dispersing agents such as surface active agents can be used, examples include nonionic surfactants as well as cationic and anionic surfactants. Nonionic surfactants are preferred where the fluid is substantially hydrocarbon, but where the fluid contains substantial amounts of water, anionic and cationic surfactants are useful. Examples of such surfactants are known in the art; for example, nonionic surfactants taught in U.S. Pat. No. 3,542,044 to Hansen. Where the surfactant is anionic, alkali metal petroleum sulfonates are useful, especially those having average equivalent weights within the range of about 350 to about 500 and more preferably about 400 to about 470.

Where the polymer is dissolved in an aqueous phase, it is preferred that the aqueous phase be free of polyvalent metallic cations. Copper and iron ions are preferably avoided but concentration levels of about 1 ppm and preferably not greater than about 5 ppm of these ions can be tolerated without substantially adversely influencing the drag reduction properties of the polymer.

Additives such as corrosion inhibitors, biocides, sequestering agents, oxygen scavenging agents, pH control, surfactants, alcohols, etc. may be added to the external phase of the fluid. Preferably these agents are compatible with the polymer and preferably do not impart an overriding detrimental influence to the drag reduction properties of the polymer.

The fluids are preferably transported in pipelines, but can be transported in any conduit wherein turbulent flow can be characteristic of the fluid flowing therethrough.

mer A is explained; preparation of the other polymers is similar, except for variations indicated in Table 1.

To 24,000 gms of deionized water there are added 692 gms of sodium hydroxide. After cooling the solution to 30° C., 1,250 gms of acrylic acid are added. Thereafter, 5,000 gms of acrylamide are added while mixing and the pH is adjusted to 9.4. The resulting solution contains 80% by weight acrylamide (AAd) and 20% by weight sodium acrylate (NaAA) and has a total monomer concentration of 21.4% by weight. The solution is purged with $N_2$ for 20 minutes and thereafter sealed. The sample is irradiated with Cobalt 60 gamma radiation at an intensity of 18,000 rads/hr (R/hr) to a total dose of 8,800 rads (R). The resulting product is a gel-like mass.

A portion of the gel is weighed and thereafter extracted with methanol to precipitate the polymer. The polymer is dried in a vacuum oven at 36° C. and 0.02 psia for 24 hours and then to constant weight at 110° C. Weight of the dried product divided by the theoretical weight gives a monomer conversion of 93%.

A portion of the gel is solubilized in water by first extruding it through a "meat" grinder; the "spaghetti"-like extrusion is cut into "BB" size particles and then dissolved in water by agitating at a low rpm to prevent substantial shearing of the polymer.

The residue of the gel is produced in dry powder form by first extruding the gel, then dissolving it in water and thereafter adding methanol to precipitate the polymer out of the solution. The polymer is then ground to less than 20-mesh size and finally dried at 60° C. in a vacuum oven.

The intrinsic viscosity is measured at 25.5° C. in a 2 normal NaCl aqueous solution. The Huggins constant is measured by the method described in "Textbook of Polymer Chemistry," Billmeyer, Interscience Publishers, New York, 1957, pp 128–139.

The monomer used in Sample "G" is dissolved in water containing 9.1% by weight of methanol.

TABLE 1

INFORMATION ON POLYMER SAMPLES

| Polymer | AAd/NaAA Wt. Ratio | Monomer Concentration (%) | pH | Intensity (R/hr) | Total Dose (R) | Additive (%) | Monomer Conversion (%) | Intrinsic Viscosity Gel (dl/g) | Intrinsic Viscosity Powder (dl/g) | Huggins Constants Gel | Huggins Constants Powder |
|---|---|---|---|---|---|---|---|---|---|---|---|
| A | 80/20 | 21 | 9.4 | 18,000 | 8,800 | — | 93 | 23.7 | 23.0 | — | 0.19 |
| B | 70/30 | 21 | 9.4 | 20,000 | 9,800 | — | 93 | 22 | 20 | 0.19 | 0.19 |
| C | 60/40 | 22 | 9.4 | 20,000 | 10,300 | — | 93 | 23.0 | 23.0 | — | — |
| D | 70/30 | 30 | 9.5 | 230,000 | 50,000 | — | 91 | 14 | 12.8 | — | 0.38 |
| E | 70/30 | 40 | 9.5 | 10,000 | 1,760 | — | 34 | 39.4 | 33 | 0.06 | — |
| F | 70/30 | 24 | 9.5 | 100,000 | 15,000 | — | 86 | 18.5 | — | 0.24 | — |
| G | 70/30 | 27 | 9.5 | 20,000 | 11,500 | MeOH 9.1 | 91 | 12.4 | 11.7 | 0.31 | 0.38 |
| H | 70/30 | 13 | 9.5 | 220,000 | 44,000 | MeOH 15 | 96.5 | 1.0 | — | — | — |
| I | 70/30 | 13 | 9.5 | 220,000 | 44,000 | — | 96.5 | 5.8 | — | 0.64 | — |
| J | 70/30 | 25 | 9.5 | 220,000 | 44,000 | MeOH 15 | 84.0 | 6.9 | — | 0.52 | — |
| K | 70/30 | 24 | 9.5 | 20,000 | 7,660 | — | 86.7 | 28.2 | — | 0.13 | — |
| L | 70/30 | 30 | 9.5 | 20,000 | 2,667 | — | 54 | 31.0 | — | 0.04 | — |
| M | 90/10 | 40 | 9.6 | 10,000 | 1,350 | — | 24 | 53 | — | Less than 0.02 | — |

The following examples are presented to teach specific working embodiments of this invention; such are not meant to limit the interpretation of the invention. Unless otherwise specified, all percents are based on volume.

PREPARATION OF THE POLYMERS

Polymers used for testing are prepared with Cobalt 60 gamma radiation; radiation intensities and dosages are outlined in Table 1. The process for preparing Poly-

EXAMPLE I

To show how the molecular weights of the polymers of this invention compare with commercially available polymers, the following data are given:

| Polymer | Average Molecular Weight* | Huggins Constant |
|---|---|---|
| K | 20,000,000–30,000,000 | 0.13 |

| Polymer | Average Molecular Weight* | Huggins Constant |
|---|---|---|
| L | 20,000,000–30,000,000 | 0.04 |
| M | 40,000,000–80,000,000 | >0.02 |
| Partially hydrolyzed polyacrylamide #1 | 5,000,000–10,000,000 | 0.56 |
| Partially hydrolyzed polyacrylamide #2 | 7,500,000–12,500,000 | 0.38 |
| Copolymer #1 | 7,500,000–12,500,000 | 0.34 |
| Copolymer #2 | 10,000,000–20,000,000 | 0.18 |

Partially hydrolyzed polyacrylamide #1 = a commercially available, partially hydrolyzed, high molecular weight polyacrylamide obtained by a chemically catalyzed polymerization reaction, has an intrinsic viscosity of 12.7 and a Huggins constant of 0.56.
Partially hydrolyzed polyacrylamide #2 = same as above, except intrinsic viscosity = 15.1 and Huggins constant = 0.38.
Copolymer No. 1 = a commercially available, anionic acrylamide copolymer obtained by a chemically catalyzed polymerization reaction; has an intrinsic viscosity of 12.5 and a Huggins constant of 0.34.
Copolymer No. 2 = a commercially available, high molecular weight, strongly anionic copolymer of acrylamide obtained by a chemically catalyzed polymerization reaction; has an intrinsic viscosity of 22.0 and a Huggins constant of 0.18.
*Molecular weights are difficult to determine; these numbers are meant to define a range of the average molecular weight.

The prior art has accepted the facts that (1) higher molecular weight polymers are generally more effective as drag-reducing agents and (2) for a given molecular weight polymer, the more linear the polymer is, the more effective that polymer is as a drag-reducing agent.

EXAMPLE II

Comminuted oil shale at 50% by weight concentration is dispersed in water containing 200 ppm of polymer L. The mixture is transported in a pipeline under turbulent flow. This mixture as compared to a mixture under the same conditions, except absent the polymer, exhibits less fluid flow friction loss.

EXAMPLE III

Different drag-reducing agents are tested in ½-inch pipeline loop at 21° C. (temperature is controlled by a heat exchanger). A Moyno pump is used and the flow rates are such that Reynolds Numbers of 8,000 to 60,000 are obtained. The pipeline loop has a 10-foot section over which the pressure drop is measured. A flow meter within the loop determines the flow rate. Data are taken in a fully developed turbulent flow range, representative data of the turbulent flow region are as follows:

| Run | Polymer | $\Delta p/L$ (psi/mile) | Velocity (ft/second) | % Drag Reduction |
|---|---|---|---|---|
| 1 | None — Tap Water | 3,432 | 11.6 | — |
| 2 | "Partially hydrolyzed polyacrylamide #2" in Example I — this is Dow Pusher* Polymer 700, marketed by Dow Chemical Co., Midland, Michigan. | 1,610 | 12.1 | 57.5 |
| 3 | "Copolymer #2" in Example I — this is Betz Hi-Vis® polymer, marketed by Betz Laboratories, Inc., Trevose, Pennsylvania. | 1,518 | 12.1 | 60.6 |
| 4 | "Polymer #B" in Table 1. | 1,320 | 12.1 | 64.0 |
| 5 | A copolymer prepared similar to those in Table 1 from 40% sodium acrelate and 60% acrylamide — has an intrinsic viscosity of 29–30 dl/g. | 1,069 | 12.1 | 70.8 |

*Trademark

The percent drag reduction is the measure of the effectiveness of the drag-reducing agent in the tap water and is determined by dividing the difference between the pressure drop of the tap water minus the pressure drop of the particular aqueous polymer solution and dividing this difference by the pressure drop of the tap water. As can be readily ascertained, the polymers of this invention, that is Runs 4 and 5, obtain improved results over the "polymers of the prior art", i.e. Runs 2 and 3. Specifically, "Polymer #B" as compared to the Betz Hi-Vis® polymer (these polymers have substantially the same intrinsic viscosities and Huggins constants) shows an improved drag reduction over the Betz polymer.

What is claimed is:

1. A process for reducing the fluid flow friction loss of a fluid comprised of a water phase being transported through a conduit, the process comprising admixing with the water phase a polymer obtained as a product of high energy ionization radiation polymerication of an adqeous solution consisting essentially of about 40 to about 90% of water and about 10 to about 60% by weight of at least one monomer selected from the group consisting of acrylamide, methacrylamide, acrylic acid, methacrylic acid, alkali metal acrylate, alkali metal methacrylate and mixtures thereof, the radiation intensity being about 250 to about 1,000,000 rads/hr and the radiation dose being about 500 rads to about 300,000 rads, the polymer being present in sufficient concentration and having sufficient property to reduce the fluid flow friction loss, and thereafter transporting the fluid in the conduit.

2. The process of claim 1 wherein the polymer is present in concentrations of about 1 to about 10,000 ppm.

3. The process of claim 1 wherein the polymer is a homopolymer.

4. The process of claim 1 wherein the polymer is a copolymer.

5. The process of claim 4 wherein one of the monomers used to obtain the copolymer is sodium acrylate.

6. The process of claim 4 wherein one of the monomers used to obtain the copolymer is acrylamide.

7. The process of claim 1 wherein the fluid contains hydrocarbon.

8. The process of claim 7 wherein the hydrocarbon is comminuted oil shale, comminuted coal, crude oil, congealed wax, congealed wax and a partially refined fraction of crude oil, or a combination thereof.

9. The process of claim 1 wherein the polymer is a copolymer obtained by copolymerizing acrylamide and sodium acrylate.

10. The process of claim 1 wherein the radiation intensity is within the range of about 1,000 to about 300,000 rads/hr.

11. The process of claim 1 wherein the radiation dose is within the range of about 1,000 to about 100,000 rads.

12. The process of claim 1 wherein the aqueous medium is at a pH within the range of about 3 to about 13.

13. The process of claim 1 wherein the pH of the aqueous medium is within the range of about 8 to about 11.

14. The process of claim 1 wherein the fluid is transported in the conduit under substantially turbulent flow.

15. The process of claim 1 wherein the external phase is used as a veneer around a viscous fluid.

16. The process of claim 1 wherein the concentration of the water phase in the fluid is at least 20% by volume.

17. The process of claim 1 wherein the fluid is transported in the conduit under flow conditions characterized by a Reynolds Number of at least 2,000.

18. The process of claim 1 wherein the water phase is the internal phase of the fluid.

19. The process of claim 1 wherein the water phase is the external phase of the fluid.

20. A process of reducing the fluid flow friction loss of a water and hydrocarbon mixture containing at least 20% by volume water being transported in a conduit under substantially turbulent flow conditions, the process comprising admixing with the water phase about 1 to about 10,000 ppm of at least a substantially water-soluble copolymer obtained as a product of radiation polymerization of an aqueous solution consisting essentially of about 40% to about 90% water and about 10% to about 60% of a mixture of about 25 to about 99% acrylamide and about 75% to about 1% sodium acrylate, the radiation intensity being within the range of about 250 to about 1,000,000 rads/hr and the dosage being within the range of about 500 to about 300,000 rads, the copolymer having sufficient property to reduce the fluid flow friction loss, and thereafter transporting the crude oil in the conduit.

21. The process of claim 20 wherein the radiation is gamma radiation.

22. The process of claim 20 wherein the water phase is the external phase of the mixture.

23. A process for reducing the fluid flow friction loss in the transportation of a water-external slurry containing hydrocarbon and wherein the slurry is transported in a conduit at a Reynolds Number of at least 2,000, the process comprising incorporating into the water phase of the slurry about 1 to about 10,000 ppm of a water-soluble polymer obtained as a product of high energy ionization radiation polymerization of an aqueous solution consisting essentially of about 40 to about 90% water and about 10 to about 60% by weight of at least one monomer selected from the group consisting of acrylamide, methacrylamide, acrylic acid, methacrylic acid, alkali metal acrylate, alkali metal methacrylate, and mixtures thereof, the radiation intensity being about 250 to about 1,000,000 rads/hr and the radiation dose being about 500 rads to about 300,000 rads, the polymer being present in sufficient concentration and having sufficient property to reduce the fluid flow friction loss, and thereafter transporting the fluid in the conduit.

24. The process of claim 23 wherein the polymer is a copolymer obtained by copolymerizing acrylamide and sodium acrylate.

25. The process of claim 23 wherein the aqueous medium is at a pH within the range of about 3 to about 13.

26. The process of claim 23 wherein the hydrocarbon is comminuted oil shale.

27. The process of claim 23 wherein the hydrocarbon is comminuted coal.

28. The process of claim 23 wherein the hydrocarbon is a viscous crude oil having a pour point above about 50° F.

29. The process of claim 23 wherein the hydrocarbon is congealed wax.

* * * * *